Patented June 1, 1948

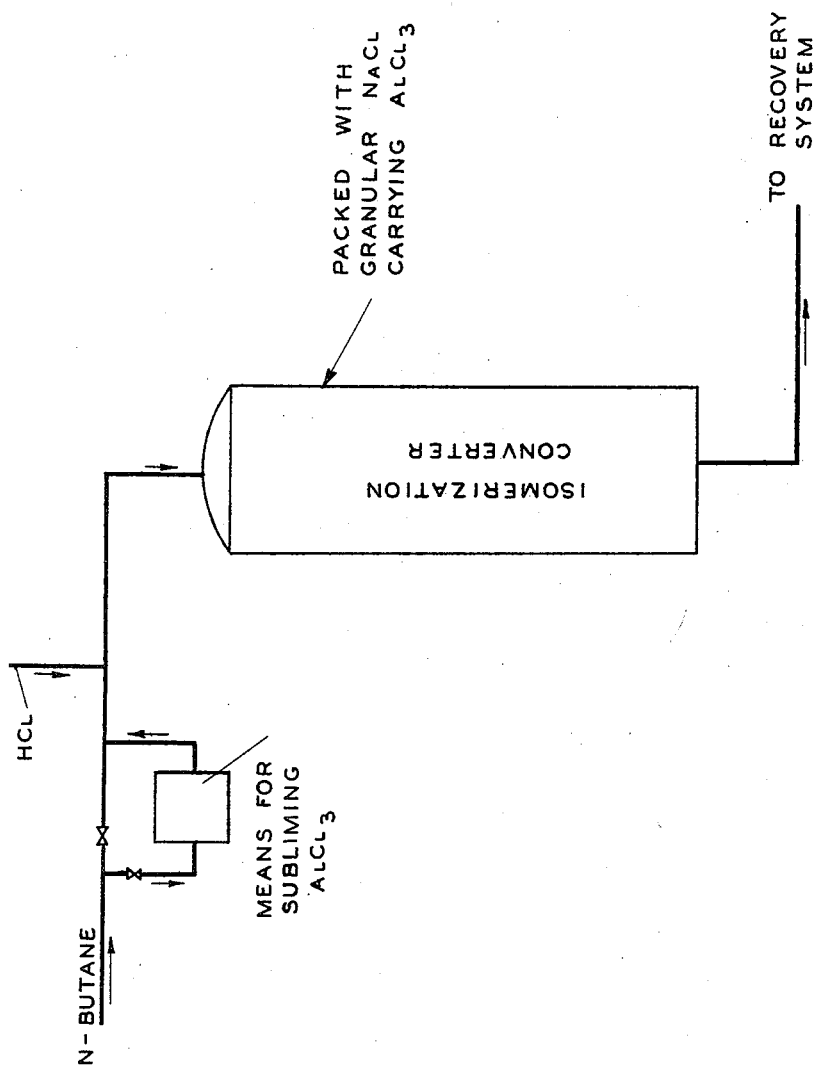

2,442,418

UNITED STATES PATENT OFFICE 2,442,418

ISOMERIZATION OF NORMAL PARAFFIN HYDROCARBONS BY CONTACT WITH ALUMINUM CHLORIDE SUPPORTED ON A METAL HALIDE

John W. Latchum, Jr., Bartlesville, and Armand D. Pickett and Gerald B. Evans, Oklahoma City, Okla., assignors to Phillips Petroleum Company, a corporation of Delaware Application June 6, 1944, Serial No. 538,998

4 Claims. (Cl. 260—683.5)

This invention relates to isomerization of normal paraffins such as butane, pentane or hexane, to isoparaffins by means of a catalyst comprising aluminum chloride and in the presence of hydrogen chloride as a promoter. It is especially applicable to the isomerization of normal butane to isobutane which is of major importance at the present time.

The principal object of the present invention is to provide an improved paraffin isomerization process. Another object is to provide such a process wherein there is used a catalyst comprising a novel type of carrier which is cheap and easily available and which gives results comparable with the best catalyst heretofore employed. Numerous other objects will more fully hereinafter appear.

The accompanying drawing which is self-explanatory portrays one arrangement of equipment useful for carrying out the present invention.

The isomerization of normal butane to isobutane by means of aluminum chloride in the presence of hydrogen chloride as an activator has become an important commercial process and our invention will be described with particular reference thereto. The aluminum chloride has been used by itself ordinarily in the form of relatively large lumps. It has also been proposed that it be used on solid porous supports such as pumice, charcoal, fuller's earth, bauxite such as a commercially available low-iron calcined bauxite, etc.

We have discovered a new class or type of support materials for the aluminum chloride used in the isomerization of normal paraffins. This class of materials can be briefly described as the chlorides of the metals in the lefthand column of group I of the periodic system. Only two of these chlorides, namely, sodium chloride and potassium chloride, are sufficiently cheap or readily available to warrant serious consideration for commercial application.

We have found that a catalyst consisting of aluminum chloride supported on a carrier consisting of granular sodium or potassium chloride is highly effective in the isomerization of normal paraffins. In actual tests we have demonstrated that rock salt as a support for aluminum chloride gives results comparable with calcined bauxite. This was unexpected since it was not foreseen that a hard crystalline non-porous water-soluble material such as sodium chloride would effect these results. In fact sodium chloride as a carrier is far superior to pumice which is in physical and chemical aspects much more like calcined bauxite than salt.

The catalyst of the present invention consists of a major proportion of granular sodium or potassium chloride, the former being preferred, and a minor proportion of aluminum chloride on the surfaces thereof. The amount of aluminum chloride should not exceed the weight of the carrier. It is preferred that the aluminum chloride range from 1 to 40 per cent by weight of the salt carrier. A range of from 1 to 25 weight per cent may be more commonly employed.

The aluminum chloride is actually supported as such on the surfaces of the granules of sodium or potassium chloride. So far as can be ascertained, there is no mingling of the aluminum chloride with the sodium or potassium chloride which would cause it to lose its identity.

A preferred mode of preparation of the catalyst is to sublime the aluminum chloride onto the sodium or potassium chloride. For example, the granular carrier may be deposited in the converter whereupon a stream of aluminum chloride vapors is passed therethrough under such conditions well within the skill of the art that the aluminum chloride is condensed in the form of a thin layer on the surfaces of the carrier. The stream of aluminum chloride vapors may be the vaporous effluent from an isomerization chamber which effluent commonly carries volatilized aluminum chloride, in which case the bed of granular sodium chloride acts as a "guard chamber" removing the aluminum chloride from the isomerization effluent. Under such circumstances, additional isomerization actually takes place in the "guard chamber." Thereafter the converter which was used as a guard chamber during formation of the catalyst may be used as a primary chamber. Thus the sodium chloride may be employed in a primary, secondary, or "guard chamber."

It is often preferred however to effect sublimation of aluminum chloride onto the sodium chloride by placing the latter in the converter and employing a subliming chamber through which hot normal paraffin feed is diverted on its way through the converter in the manner shown in the drawing. Ordinarily the hydrogen chloride feed is discontinued while the catalyst is being made in this way. When a suitable amount of aluminum chloride has been thus deposited onto the surfaces of the sodium chloride granules, the subliming unit is by-passed and the converter placed on-stream in the usual way.

The subliming unit is used periodically whenever it is desired to replenish the aluminum chloride on the carrier.

Following are examples of actual butane isomerization runs made using rock salt supporting aluminum chloride in the secondary chamber.

*Examples*

A mixture of hydrocarbons consisting essentially of isobutane and normal butane, hydrogen chloride and some volatilized aluminum chloride and issuing from a primary chamber was passed through a secondary chamber containing aluminum chloride supported on rock salt and analyzing 1.3% aluminum chloride, 94.2% sodium chloride, 0.67% calcium sulfate, 0.32% magnesium sulfate, 0.14% magnesium chloride and 3.37% insoluble material. Two separate and distinct runs were made. The inlet temperature was 234° F. in the first and 232° F. in the second run. The outlet temperature was 194° F. in the first and 212° F. in the second run. The pressure in each run was 190 p. s. i. The per cent by volume of hydrogen chloride in the feed was 7.6% in the first and 5.3% in the second run. The isobutane content of the hydrocarbons was increased from 28.5 to 40% in the first run and from 6.5 to 20% in the second run. Each run was for a period of three days.

From the foregoing it will be seen that the present invention provides a novel and improved method of isomerizing normal paraffins to isoparaffins. The carrier and especially sodium chloride is cheap and readily available. It performs practically as well as calcined bauxite which is now most widely used. The carrier does not melt down thus rendering use of high temperatures feasible. The carrier operates well even though the percentage of $AlCl_3$ is very low. The carrier of the present invention works as well as calcined bauxite in the secondary chamber whereas pumice gives no appreciable conversion when used under the same conditions. Numerous other advantages of the present invention will be apparent to those skilled in the art.

We claim:

1. The process of isomerizing normal paraffins to isoparaffins which comprises passing said normal paraffin in admixture with hydrogen chloride as a promoter over a catalyst consisting of aluminum chloride supported as a thin layer on the surfaces of a carrier consisting of a granular chloride of a metal selected from the left-hand column of group I of the periodic system, the proportion of said aluminum chloride on said carrier ranging from 1 to 40 weight per cent of said chloride of said metal, said aluminum chloride being supported as such on the surfaces of the granules of said granular chloride, there being no ascertainable mingling of the aluminum chloride with the granular chloride, under conditions such that isomerization of said normal paraffin to isoparaffin is the principal reaction.

2. The process of isomerizing normal paraffins to isoparaffins which comprises passing said normal paraffin in admixture with hydrogen chloride as a promoter over a catalyst consisting of aluminum chloride supported as a thin layer on the surfaces of a carrier consisting of granular sodium chloride, the proportion of said aluminum chloride on said sodium chloride ranging from 1 to 40 weight per cent of said sodium chloride, said aluminum chloride being supported as such on the surfaces of the granules of said sodium chloride, there being no ascertainable mingling of the aluminum chloride with the sodium chloride, under conditions such that isomerization of said normal paraffin to isoparaffin is the principal reaction.

3. The process of isomerizing normal butane to isobutane which comprises passing said normal butane in admixture with hydrogen chloride as a promoter over a catalyst consisting of aluminum chloride supported as a thin layer on the surfaces of a carrier consisting of granular sodium chloride, the proportion of said aluminum chloride on said sodium chloride ranging from 1 to 40 weight per cent of said sodium chloride, said aluminum chloride being supported as such on the surfaces of the granules of said sodium chloride, there being no ascertainable mingling of the aluminum chloride with the sodium chloride, under conditions such that isomerization of said normal butane to isobutane is the principal reaction.

4. The process of isomerizing normal paraffins to isoparaffins which comprises passing said normal paraffin in admixture with hydrogen chloride as a promoter over a catalyst consisting of aluminum chloride supported as a thin layer on the surfaces of a carrier consisting of granular sodium chloride, the proportion of said aluminum chloride on said sodium chloride ranging from 1 to 25 weight per cent of said sodium chloride, said aluminum chloride being supported as such on the surfaces of the granules of said sodium chloride, there being no ascertainable mingling of the aluminum chloride with the sodium chloride, under conditions such that isomerization of said normal paraffin to isoparaffin is the principal reaction.

JOHN W. LATCHUM, Jr.
ARMAND D. PICKETT.
GERALD B. EVANS.

REFERENCES CITED

The following references are of record in the file of this patent:

UNITED STATES PATENTS

| Number | Name | Date |
|---|---|---|
| 2,169,494 | Ipatieff et al. | Aug. 15, 1939 |
| 2,277,512 | De Simo et al. | Mar. 24, 1942 |
| 2,311,232 | Ipatieff et al. | Feb. 16, 1943 |
| 2,324,746 | Weinrich et al. | July 20, 1943 |
| 2,353,899 | Ipatieff et al. | July 18, 1944 |

FOREIGN PATENTS

| Number | Country | Date |
|---|---|---|
| 117,433 | Australia | Sept. 2, 1943 |